United States Patent [19]
Erickson

[11] Patent Number: 5,851,093
[45] Date of Patent: Dec. 22, 1998

[54] COUPLING SYSTEM FOR MACHINE TOOLS

[75] Inventor: Robert A. Erickson, Raleigh, N.C.

[73] Assignee: Kennametal Inc., Latrobe, Pa.

[21] Appl. No.: 908,652

[22] Filed: Aug. 7, 1997

[51] Int. Cl.[6] ...................................................... B23C 1/00
[52] U.S. Cl. ............................ 409/234; 82/160; 408/240; 409/232
[58] Field of Search .................................... 409/232, 233, 409/234; 82/160; 408/239 A, 240; 279/211, 212

[56]           References Cited
         U.S. PATENT DOCUMENTS

| | | | |
|---|---|---|---|
| 4,063,488 | 12/1977 | Kagerer | 90/11 D |
| 4,135,848 | 1/1979 | Hughes et al. | 408/239 A |
| 4,350,463 | 9/1982 | Friedline | 409/234 |
| 4,620,824 | 11/1986 | Eckstein et al. | 409/233 |
| 4,680,999 | 7/1987 | Kojima et al. | 82/36 B |
| 4,708,040 | 11/1987 | Erickson | 409/233 |
| 4,863,323 | 9/1989 | Glaser | 409/232 |
| 4,997,325 | 3/1991 | Heel et al. | 409/233 |
| 5,352,074 | 10/1994 | Ishikawa | 409/232 |
| 5,466,102 | 11/1995 | Erickson | 409/232 |
| 5,697,740 | 12/1997 | Von Haas et al. | 409/234 |
| 5,722,806 | 3/1998 | Erickson et al. | 409/233 |

*Primary Examiner*—Andrea L. Pitts
*Assistant Examiner*—Christopher Kirkman
*Attorney, Agent, or Firm*—John J. Prizzi

[57]              ABSTRACT

An improved coupling system for lockably coupling machine tool components is provided that includes a male coupling, a female coupling having an axis, a pair of opposing jaw members having lock surfaces for engaging ledge surfaces in the male coupling when the jaw members are moved apart, and a drive train having first and second drive spheres for simultaneously moving proximal and distal ends of the jaw members apart. The drive spheres engage ramps on the inner surfaces of the jaw members that have cylindrical profiles to provide lenticular contact between the spheres and the jaw members. Cam and follower surfaces are provided between the jaw members and one of the male or female couplings to enhance the locking force between the couplings. The invention provides a more rigid coupling between the male and female components by providing two locking spheres that operate in tandem to simultaneously spread the distal and proximal ends of the jaw members apart.

20 Claims, 3 Drawing Sheets

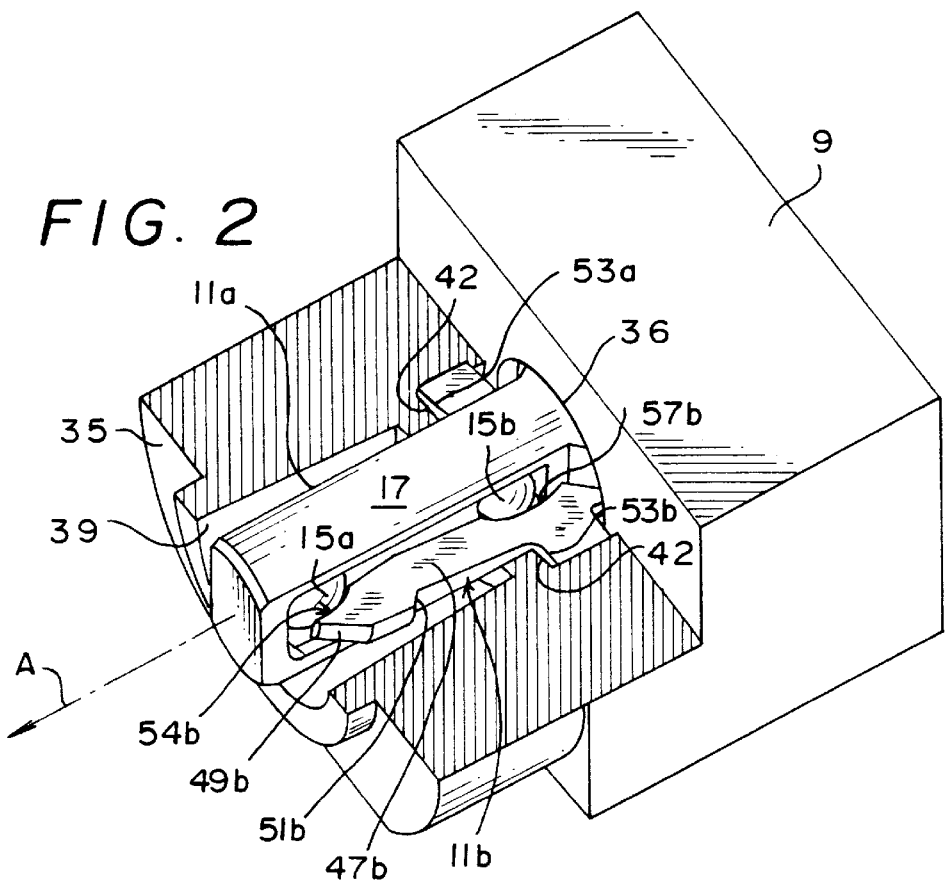
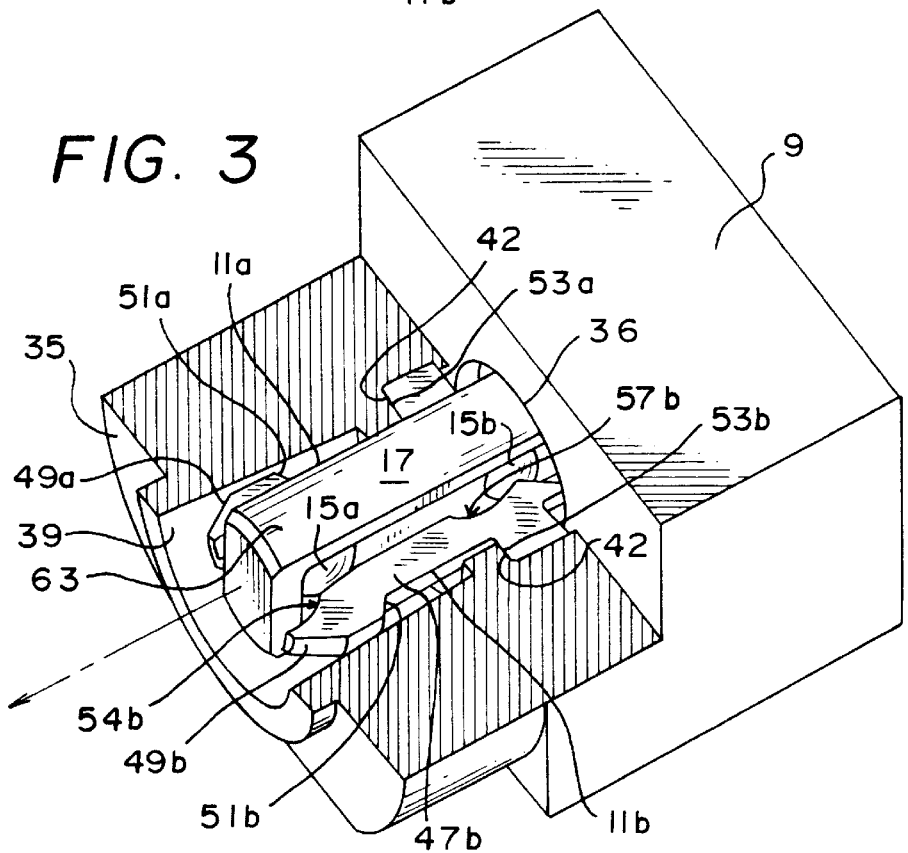

COUPLING SYSTEM FOR MACHINE TOOLS

BACKGROUND OF THE INVENTION

This invention generally relates to a system for coupling machine tools and is specifically concerned with an improved coupling system of the type having a jaw-type clamping mechanism wherein the improvement comprises a drive train that simultaneously spreads the proximal as well as the distal ends of the jaws to provide a more rigid coupling.

Coupling systems for interconnecting machine tools are well known to the prior art. Such coupling systems include a hollow, frustro-conical male component that forms part of the tool. The male component mates with a frustro-conical opening in a female component that is typically part of a spindle for rotating the tool. The taper of both the frustro-conical components typically has a slope of about 1–10 with respect to the longitudinal axis of the tool. Such a slope provides a rigid, on-center interference coupling when the components are pulled together by means of a clamping mechanism disposed in the interior of the female opening.

A variety of mechanisms are presently available for clamping together the male and female components of prior art coupling systems. In some of these mechanisms, the female component includes radially movable locking balls for engaging complementarily-shaped socket openings in the walls of the male component. When moved radially outwardly, the locking balls function to secure and pull the frustro-conical male tool shank into the opening of the female component. An axially slidable lock bar having cam surfaces radially forces the locking balls outwardly into the socket openings. In other types of mechanisms, the female opening includes a radially expandable locking plunger which is extendable into the hollow interior of the frustro-conical male component. The locking plunger may include two or more radially movable fingers that engage openings in the wall of the male component in order to forcibly wedge the male component into the opening of the female component.

While both of these general types of prior art coupling systems have shown themselves to be effective for their intended purpose, systems fabricated by different manufacturers are unfortunately not interchangeable with one another. Thus the end user of a tooling system has, up to recently, been forced to choose between one particular type of proprietary tooling and coupling system or another. To remedy this problem, the German government in 1987 standardized the dimensions of the envelope that such coupling systems were to have in a proclamation entitled "DIN 69890". However, this proclamation did not standardize the aspect ratio or type of coupling mechanism that was to clamp together the frustro-conical male and female components. Standardization specifications that permitted such interchangeability did not occur in Germany until the issuance of a later proclamation entitled "DIN 69893" in 1993, which set forth the dimensions of the male component and female taper area that would secure the components together. This last proclamation also specified that the male component must have an annular shoulder circumscribing its interior that defines a follower surface. By implication, the female component is to have a member with a cam surface for engaging the male follower surface in order to lock the two components together. The standardized coupling system specified in DIN 96893 is already being manufactured by several German-based tooling companies, whose systems are being sold to several of the major German automotive manufacturers. The growing implementation of DIN 69893 in Germany and elsewhere is likely to result in the adoption of these same specifications internationally. DIN 69893 does not specify what form that any cam members in the female component should take, or what drive mechanism is to be used to move these cam members into engagement with the follower surface within the male component. One particularly successful design employs a pair of opposing jaw members disposed in the interior of the female coupling. Each of the jaw members includes a foot on its proximal end which slides into a complementarily shaped recess on the inner diameter of the female coupling in order to pivotally mount the jaw members. The distal end of each of these members includes a cam surface which interacts with the follower surface on the male coupling when the jaw members are pivotally spread apart in order to lock the two components together. The drive mechanism for this particular design includes a single locking sphere disposed between the distal ends of the opposing jaw members. A lock bar axially moves the locking sphere toward the proximal ends of the jaw members so that the locking sphere wedgingly spreads the proximal ends of these members apart into locking engagement with the follower surface in the male coupling. Such a clamping mechanism advantageously provides a rigid coupling by means of a relatively simple part which can be easily replaced when worn. The use of a free floating sphere as the wedging element in this design is particularly advantageous as the wear on the sphere due to its wedging action does not occur on the same location, but instead is spread out over the surface of the sphere, thereby protracting the life of the mechanism.

While such a drive mechanism has proven its effectiveness in rigidly locking a male and female coupling together, the applicant has observed several areas where the operation of this mechanism might be improved. For example, the pivoting movement between the feet of the jaw members and their respective recesses within the female coupling results in a smaller contact area between the jaw members and the interior surfaces of the male and female coupling than would occur if the jaw members could be uniformly spread apart without such a pivoting movement. The pivoting action of the jaw members also requires that the cam surfaces and feet be manufactured to higher tolerances than would be necessary if the entire jaw member could be spread apart uniformly across its entire length.

Clearly, there is a need for an improved coupling system of the type that employs opposing jaw members to lockably interconnect a male coupling to a female coupling that has a drive mechanism capable of spreading apart the proximal as well as distal ends of the jaw members so as to overcome the aforementioned shortcomings associated with prior art systems. Ideally, such a drive system should be inexpensive to manufacture, readily adaptable to existing systems, and reliable in operation. Finally, such an improved system should retain all of the advantages of associated with drive mechanisms that utilize spherical components to wedgingly spread apart a pair of locking jaws.

SUMMARY OF THE INVENTION

Generally speaking, the invention is an improved coupling system for lockably coupling machine tool components that comprises a male coupling having ledge surfaces, a female coupling, a pair of opposing jaw members having proximal ends movably mounted within the female coupling, and distal ends having lock surfaces for engaging the ledge surfaces of the male coupling when said jaw members are moved apart, and a drive train for moving the jaw members apart that includes first and second drive spheres and means for simultaneously moving the drive spheres into and out of wedging engagement with inner surfaces of proximal and distal ends of the opposing jaw members.

Each of the inner surfaces of the jaw members has proximal and distal ramps for wedgingly engaging the first and second drive spheres. Advantageously, each of these ramps has a cylindrical profile so that the drive spheres engage these ramps in lenticular contact. Each of the jaw members includes a foot that extends orthogonally from its proximal end that is receivable within a complimentarily-shaped recess in the female coupling to movably mount the jaw member within the female coupling. The means for moving the drive spheres is preferably a lock bar having first and second bores disposed orthogonally with respect to the axis of the female coupling. The drive spheres freely float within their respective bores in the lock bar so that different surfaces of the spheres are used to engage and expand the opposing jaw members over the operational life of the coupling system, thereby avoiding localized areas of wear in the drive spheres. This free floating feature also advantageously compensates for normal tolerances associated with the fabrication of the jaw members and lock and ledge surface.

The ledge and lock surfaces of the male coupling and jaw members may include cam and follower surfaces that cooperate to increase the locking force between the male and female couplings when the drive train moves the jaw members apart. In an alternative embodiment, the feet and recess of the jaw members and female coupling may include cam and followers surfaces to likewise increase the locking force between the male and female couplings. This alternate embodiment is particularly useful in arrangements wherein the ledge and lock surfaces of the jaw members and male coupling are orthogonally disposed with respect to the axis of the female coupling.

Both embodiments include a detachment mechanism for pivotally moving the jaw members together to unmate the male and female couplings when the lock bar moves the first and second drive spheres out of wedging engagement with the ramps on the inner surfaces of the jaw members. This detachment mechanism includes a bump wall disposed on the proximal end of each of the jaw members, and opposing bump surfaces on the lock bar for pivotally moving the jaw members inwardly upon engagement with the bump walls of these members.

By providing a second locking sphere that moves the proximal ends of the jaw members apart while the first sphere simultaneously moves the distal ends apart, the invention advantageously provides a more rigid joint between the male and female couplings by virtue of increased surface contact between the jaws and couplings. The elimination of a pivoting action during the locking operation also allows for some relaxation in the dimensional tolerances of the jaw members.

BRIEF DESCRIPTION OF THE SEVERAL FIGURES

FIG. 2 is a partial cross-sectional plan view of the female coupling of the system with the lock bar in an extended position and the jaw members in a retracted, unlocked position;

FIG. 3 illustrates the female coupling of FIG. 2 with the lock bar in a retracted position and the jaw members in a radially extended locking position;

Figure 4:
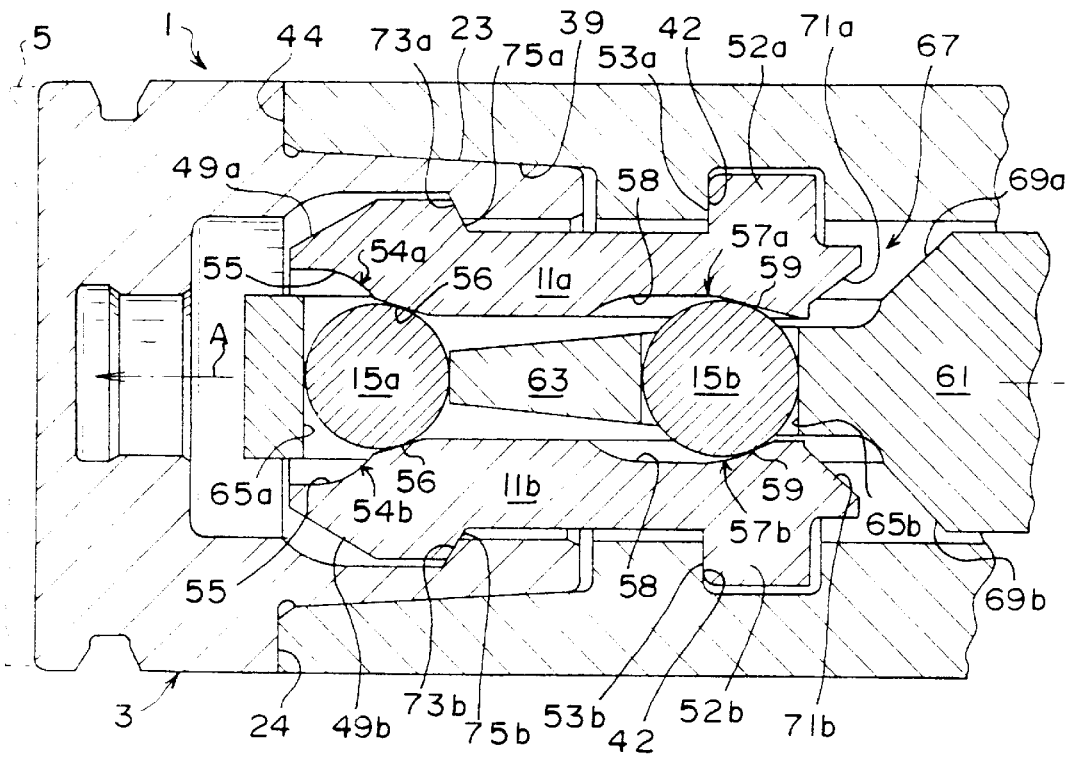
Figure 5:
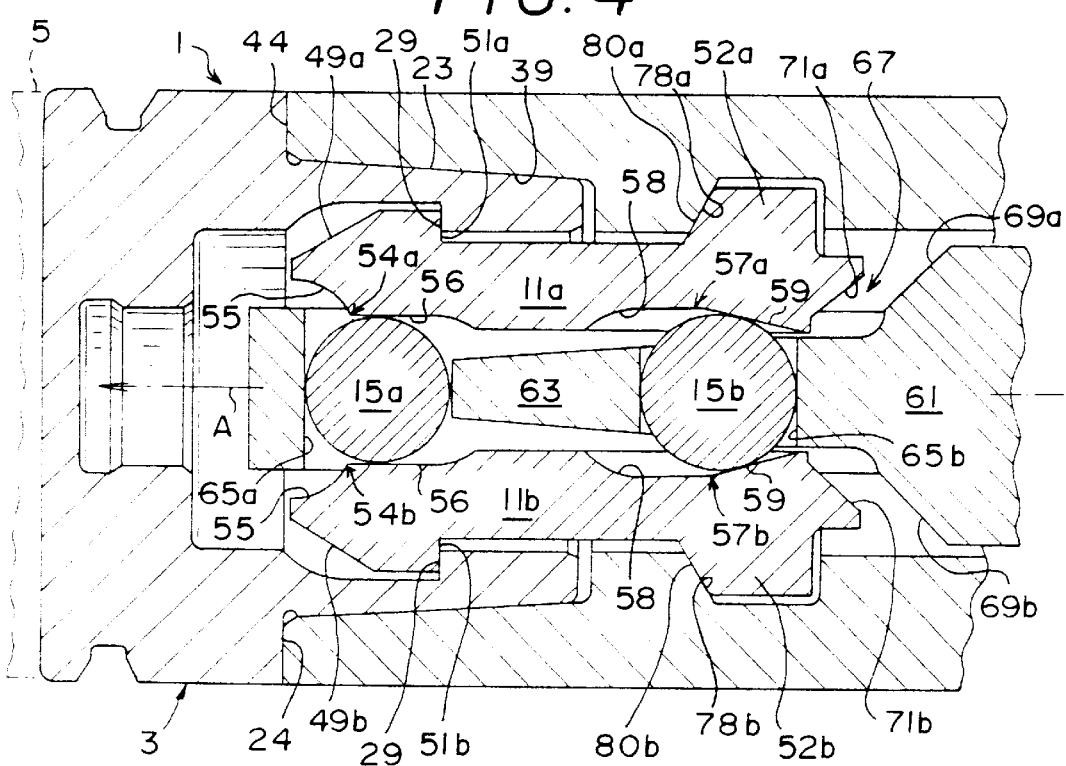

FIG. 4 is a cross-sectional side view of a first embodiment of the coupling system wherein the annular ledge of the male coupling defines a cam surface and the lock surfaces of the jaw members define follower surfaces, and FIG. 5 is a cross-sectional side view of an alternate embodiment wherein the ledge surface of the body of the female coupling defines a cam surface and the distal lock surfaces of the jaw members define follower surfaces.

DETAILED DESCRIPTION OF THE PREFERRED EMBODIMENT

Figure 1:
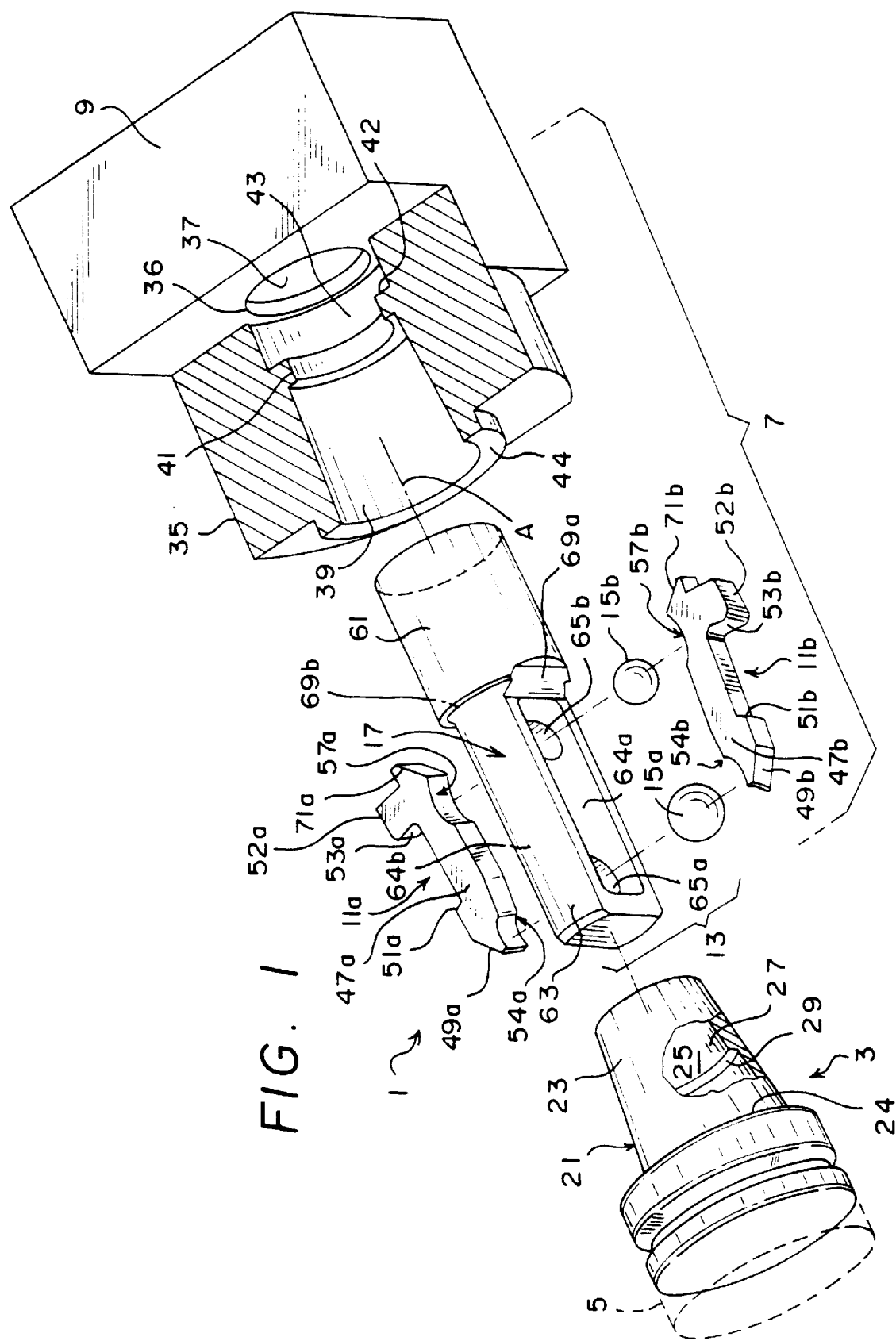
FIG. 1 is an exploded view of the coupling system of the invention, wherein partial cross-sectional views are given of the male and female couplings.

With reference now to FIG. 1, wherein like numbers represent like components throughout all the several Figures, the coupling system 1 of the invention generally comprises a male coupling 3 which is connected to a tool body 5 (indicated in phantom), and a female coupling 7 which is attached to a tool holder 9. The tool body 5 may hold a cutting tool (not shown) such as a single cutting insert, a milling cutter, or a drill bit. The tool holder 9 may be attached to a rotating spindle or extendable and retractable tool arm (also not shown).

As may best be seen in FIGS. 1, 2 and 3, the female coupling 7 includes a pair of movable jaw members 11$a,b$ and a drive train 13 for radially extending and retracting these members into and out of engagement with an annular shoulder 27 disposed in the interior of the male coupling 3. To this end, the drive train 13 includes a pair of drive spheres 15$a,b$ which are removably mounted in bores present in a lock bar 17 that is extendable and retractable along an axis A. As will be explained in more detail hereinafter, such an axial movement of the lock bar 17 moves the drive spheres 15$a,b$ into simultaneous, wedging engagement with distal and proximal ramp surfaces present along the interior surface of the jaw members 11$a,b$, thereby simultaneously extending or retracting both the proximal and distal ends of these members.

The male coupling 3 is largely formed from a hollow shank 21 having a frustro conical outer surface 23. The base of the frustro conical surface 23 is circumscribed by an annular face 24. As will become evident hereinafter, annular face 24 engages a ring shaped coupling face 44 extending from the female coupling 7 when the two couplings are mated. The shank 21 has a generally hollow interior 25. An annular shoulder 27 circumscribes the inner diameter of the shank 21. This annular shoulder 27 defines a ledge surface 29 which is grippable by distal lock surfaces present on the ends of the jaw members 11$a,b$.

The female coupling 7 is formed from a cylindrical body 35 (shown in cross section in FIGS. 1, 2 and 3 to facilitate an understanding of the invention) that may be integrally connected to the tool holder 9. Tool holder 9 includes an aperture 36 which leads to a hollow interior 37 for housing a base portion of the lock bar 17. The cylindrical body 35 of the female coupling 7 includes a frustro-conical inner wall 39 that is complimentary in shape to the frustro conical outer surface 23 of the male coupling 3. The proximal end of inner wall 39 is circumscribed by an annular guide ring 41 which is concentrically aligned with the lock bar aperture 36 of the tool holder 9. The proximal wall of the guide ring 41 defines an annular ledge surface 42 which cooperates with the feet of the jaw members 11$a,b$ to mate the male 3 and female 7 couplings. An annular recess 43 is defined between the ledge surface 42 and the front wall of the tool holder 9 for housing the aforementioned feet of the jaw members 11$a,b$. The proximal end of the frustro-conical inner wall 39 terminates in the previously mentioned ring-shaped coupling face 44.

With reference again to FIGS. 1, 2 and 3, each of the jaw members 11$a,b$ includes an elongated body portion 47$a,b$ which terminates, on its distal end, in a tapered lead in surface 49a,b. Distal lock surfaces 51a,b are disposed behind the tapered lead in surfaces 49a,b. Each of the jaw members 11a,b terminates on its proximal end, in feet 52a,b which extend orthogonally from the elongated body portions 47a,b. The distal, right angled faces of each of the feet 52a,b define proximal lock surfaces 53a,b which are engagable against the previously mentioned ledge surface 42 defined by annular guide ring 41 of the female coupling 7. Disposed on the inner surfaces of each of the jaw members 11a,b are distal ramp surfaces 54a,b and proximal ramp surfaces 57a,b. Distal ramp surfaces 54a,b include both a sphere retaining portion 55 for retaining the distal drive sphere 15a when the lock bar 17 is extended into the position illustrated in FIG. 2, as well as a cam portion 56 for wedgingly engaging the sphere 15a when the lock bar 17 is retracted into the position illustrated in FIG. 3. Jaw members 11a,b further have proximal ramp surfaces 57a,b on the proximal ends of their inner surfaces. With reference now to FIG. 4, each of these proximal ramp surfaces 57a,b also includes a sphere retaining portion 58 and cam portion 59 for retaining and wedgingly engaging the proximal drive sphere 15a. Advantageously, the cam portions 56, 59 of the distal and proximal ramp surfaces 54a,b and 57a,b have a cylindrical profile so that a relatively broad, lenticular contact is achieved between the surfaces of the spheres 15a,b and cam portions 56, 59. Such lenticular contact avoids the relatively higher stresses and wear that results from point or line type contact between wedge elements.

As is best seen in FIG. 1, the lock bar 17 includes a base portion 61 that is normally disposed within the hollow interior 37 of the tool holder 9. While not specifically shown in any of the specific drawings, the base portion 61 is connected to a driver, which may be a stack of Bellville washers for forcefully extending and withdrawing the lock bar 17 along the axis A. Lock bar 17 further includes a sphere retaining portion 63 that is characterized by opposing, elongated recesses 64a,b. These recesses 64a,b allow the curved surfaces of the drive spheres 15a,b to engage the distal and proximal lock surfaces 51a,b and 53a,b located on the interior surfaces of the jaw members 11a,b. A pair of parallel through bores 65a,b extend through the distal and proximal ends of the sphere retaining portion 63 of the lock bar 17 for receiving and retaining the drive spheres 15a,b. The inner diameter of each of the bores 65a,b is slightly larger than the outer diameter of the drive spheres 15a,b to allow the spheres 15a,b some measure of rotational freedom. Such freedom advantageously causes the spheres 15a,b to present different engagement surfaces to the distal and proximal ramp surfaces 54a,b and 57a,b of the jaw members 11a,b during the operation of the coupling system 1, thereby avoiding localized areas of frictional wear on the spheres 15a,b. This freedom also allows the drive spheres to compensate for small manufacturing imperfections in the jaw members 11a,b and lock and ledge surfaces.

With reference now to FIGS. 4 and 5, both embodiments of the coupling system 1 include a detachment mechanism 67 for detaching the distal lock surfaces 51a,b of the jaw members 11a,b from the ledge surfaces 29 of the male coupling 3. Detachment mechanism 67 is formed from a pair of tapered bump surfaces 69a,b that are engagable against tapered bump walls 71a,b located at the proximal ends of each of the jaw members 11a,b. The bump surfaces 69a,b and bump walls 71a,b are not parallel, but are instead canted 5° to 10° with respect to one another when the jaw members 11a,b are in their radially extended position as shown in FIGS. 4 and 5. Hence, when the bump surfaces 69a,b of the lock bar 17 are rammed against the bump wall 71a,b of the jaw members 11a,b, the jaw members 11a,b will be pivoted inwardly so that the distal and proximal lock surfaces 51a,b and 53a,b are disengaged from their respective ledge surfaces 29, 42.

FIG. 4 illustrates a first embodiment of the invention wherein the distal lock surfaces of the jaw members 11a,b are cam surfaces 73a,b, and the ledge m surfaces 29 of the male coupling 3 define follower surfaces 75a,b. By contrast, the proximal lock surfaces 53a,b and ledge surfaces 42 of the female coupling 7 are disposed orthogonally with respect to the axis A. Hence, when the lock rod 16 is withdrawn to the right in the position illustrated in FIG. 4, the drive spheres 15a,b engage the cam portions 56, 59 of the distal and proximal ramp surfaces 54a,b; 57a,b to simultaneously radially extend both the proximal and distal ends of the jaw members 11a,b. The radial extension of the distal end of the jaw members 11a,b causes the follower surfaces 75a,b of the jaw members 11a,b to engage the cam surfaces 73a,b of the male coupling 3 in such a way that the shank 21 of the coupling 3 is pulled farther into the frustro conical cavity defined by the inner wall 39. At the same time, the proximal lock surfaces 53a,b extending from the feet 52a,b of the jaw members orthogonally slide over the ledge surface 42 of the cylindrical body 35, thereby providing a second relatively broad area of contact between the jaw members 11a,b and the attached couplings 3 and 7. The simultaneous radial extension of both the distal and proximal ends of the jaw members 11a,b, in combination with the broad areas of contact between these members 11a,b and the couplings 3 and 7 provides a more rigid coupling than prior art devices which extend only the distal ends of the jaw members by way of a mechanical action wherein each of these members is pivoted about its proximal foot.

FIG. 5 illustrates an alternate embodiment wherein the inner engaging cam and follower surfaces between the jaw members 11a,b and the couplings are located between the feet 52a,b of the jaw members 11a,b and the ledge surface 42. Specifically, the ledge surface 42 is replaced by annular, frustro conical cam surfaces 78a,b, while the proximal lock surfaces on the feet 52a,b have been replaced by follower surfaces 80a,b. By contrast, the distal lock surfaces 51a,b and ledge surfaces 29 within the male coupling 7 are oriented orthogonally with respect to the axis A of movement of the lock bar 17. Accordingly, when the drive spheres 15a,b are withdrawn into the position illustrated in FIG. 5, they simultaneously react against the cam portions 56, 59 of the distal and proximal ramp surfaces 54a,b and 57a,b to simultaneously radially extend both the distal and proximal ends of the jaw members 11a,b, thereby causing the proximal cam and follower surfaces 78a,b and 80a,b to pull the male coupling 3 deeper inside the recess defined by the frustro conical inner wall 39 of the female coupling 7.

In both cases, the broad lenticular contact between the distal and proximal ramp surfaces 54a,b and 57a,b and their respective drive spheres 15a,b in combination with the ability of the drive spheres 15a,b to move within the bores 65a,b in the sphere retaining portion 63 of the lock bar 17 minimizes areas of local stress between the spheres 15a,b and jaw members 11a,b, thereby enhancing the longevity and reliability of the coupling system 1.

While this invention has been described with respect to two preferred embodiments, different modifications, variations, and additions will become apparent to persons of ordinary skill in the art. All such modifications, variations, and additions are encompassed within the scope of this invention, which is confined only by the claims appended hereto.

What is claimed is:

1. A coupling system for lockably coupling machine tool components, comprising:
   (a) a male coupling having a recess at a distal end that includes ledge surfaces;
   (b) a female coupling having an axis, and an opening disposed along said axis for receiving the distal end of said male coupling;

(c) a pair of opposing jaw members having proximal ends movably mounted within said opening in said female coupling, and distal ends having lock surfaces for engaging said ledge surfaces of said male coupling when said jaw members are moved apart to mate said male and female couplings, both of said jaw members having opposing inner surfaces, and (d) a drive train for moving said jaw members apart including first and second drive spheres, and means for simultaneously moving said first and second drive spheres into and out of wedging engagement with said inner surfaces of said proximal and distal ends of said opposing jaw members.

2. The coupling system as defined in claim 1, wherein said inner surfaces of said jaw members have proximal and distal ramps for wedgingly engaging said first and second drive spheres.

3. The coupling system as defined in claim 2, wherein each of said ramps has a cylindrical profile such that said first and second drive spheres engage said proximal and distal ramps in lenticular contact.

4. The coupling system as defined in claim 1, wherein said means for simultaneously moving said drive spheres includes a lock bar.

5. The coupling system as defined in claim 4, wherein said lock bar includes first and second bores disposed orthogonally with respect to said axis of said female coupling, and wherein said first and second drive spheres freely float within said bores.

6. The coupling system as defined in claim 1, wherein said first and second drive spheres are different diameters.

7. The coupling system as defined in claim 3, wherein each of said ramps is inclined between 10° and 20° with respect to said axis of said female coupling.

8. The coupling system as defined in claim 1, wherein each of said jaw members includes a foot that extends orthogonally from said proximal end that is receivable within a recess in said female coupling to movably mount said jaw member on said female coupling.

9. The coupling system as defined in claim 1, further comprising a detachment means for moving said jaw members together to unmate said male and female couplings when said lock bar moves said first and second drive spheres out of wedging engagement with said ramps of said opposing jaw members.

10. The coupling system of claim 9, wherein said detachment means comprises a bump wall disposed on said proximal end of each jaw member that engages a bump surface disposed on said lock bar when said lock bar is axially moved to disengage said drive spheres from said ramps of said jaw members.

11. A coupling system for lockably coupling machine tool components, comprising:

(a) a male coupling having a recess at a distal end that includes ledge surfaces;

(b) a female coupling having an axis, and an opening concentrically disposed along said axis for receiving the distal end of said male coupling;

(c) a pair of opposing jaw members having proximal ends movably mounted within said opening in said female coupling, and distal ends having lock surfaces for engaging said ledge surfaces when said jaw members are moved apart to mate said male and female couplings, both of said jaw members having opposing inner distal and proximal ramp surfaces, and (d) a drive train for moving said jaw members apart including first and second drive spheres disposed between said opposing distal and proximal ramp surfaces, respectively, for wedging apart said distal and proximal ends of said jaw members, and an axially movable lock bar for simultaneously moving said first and second drive spheres into and out of wedging engagement with said distal and proximal ramp surfaces.

12. The coupling system defined in claim 11, wherein said ramp surfaces have a cylindrical profile such that said drive spheres engage said ramps in lenticular contact.

13. The coupling system defined in claim 11, wherein said first and second drive spheres are movably mounted in said lock bar to allow different surface portions of said drive spheres to engage said ramps every time said drive train is actuated to mate said male and female couplings.

14. The coupling system as defined in claim 13, wherein said lock bar includes first and second bores disposed orthogonally with respect to said axis of said female coupling, and wherein said first and second drive spheres freely float within said bores.

15. The coupling system as defined in claim 13, wherein said first and second drive spheres are different diameters.

16. The coupling system as defined in claim 11, wherein each of said jaw members includes a foot that extends orthogonally from said proximal end that is receivable within a recess in said female coupling to movably mount said jaw member on said female coupling.

17. The coupling system as defined in claim 16, wherein said foot of each of said jaw members includes a cam surface that engages a follower surface of said recess in said female coupling to axially retract said jaw members within said female coupling as said drive train moves said jaw members apart to increase the locking forces between said male and female couplings.

18. The coupling system defined in claim 16, wherein said ledge and lock surfaces of said jaw members and male coupling include cam and follower surfaces to increase the locking force between said male and female couplings.

19. The coupling system defined in claim 11, further comprising a detachment means for pivotally moving said jaw members together to unmate said male and female couplings including a bump wall disposed on said proximal end of each jaw member that engages a bump surface disposed on said lock bar when said lock bar is axially moved to disengage said drive spheres from said ramp surfaces of said jaw members.

20. An improved coupling system for lockably coupling machine tool components of the type including a male coupling having a recess at a distal end that includes ledge surfaces; a female coupling having an axis, and an opening disposed along said axis for receiving the distal end of said male coupling; a pair of opposing jaw members having proximal ends movably mounted within said opening in said female coupling, and distal ends having lock surfaces for overlapping and engaging said ledge surfaces when said jaw members are moved apart to mate said male and female couplings, both of said jaw members having opposing inner surfaces; and a drive train for pivotally moving said jaw members apart including a first drive sphere disposed between the inner surfaces of said distal ends of said jaw members, and an axially movable lock bar for moving said first drive sphere into wedging engagement with said inner surfaces of said distal ends of said jaw members to spread apart said members, wherein the improvement comprises a second drive sphere operatively associated with said lock bar for wedgingly engaging the inner surfaces of said proximal ends of said jaw members such that said distal and proximal ends are simultaneously spread apart.

* * * * *